July 12, 1927.
H. J. HOLFORD
1,635,845
MEANS FOR SEPARATING WATER AND OTHER IMPURITIES FROM MINERAL OR OTHER OILS OR LIQUIDS
Filed Sept. 9, 1925
2 Sheets-Sheet 2
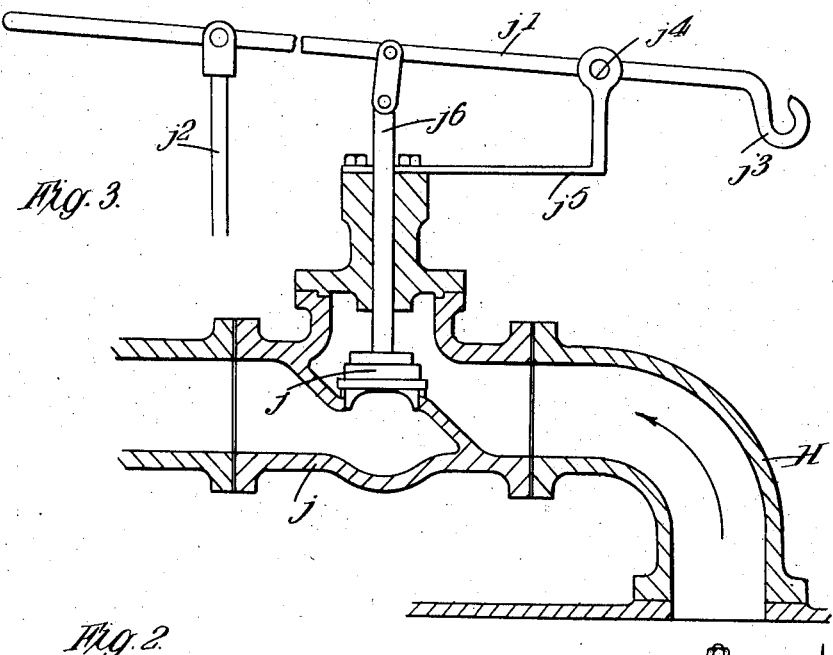
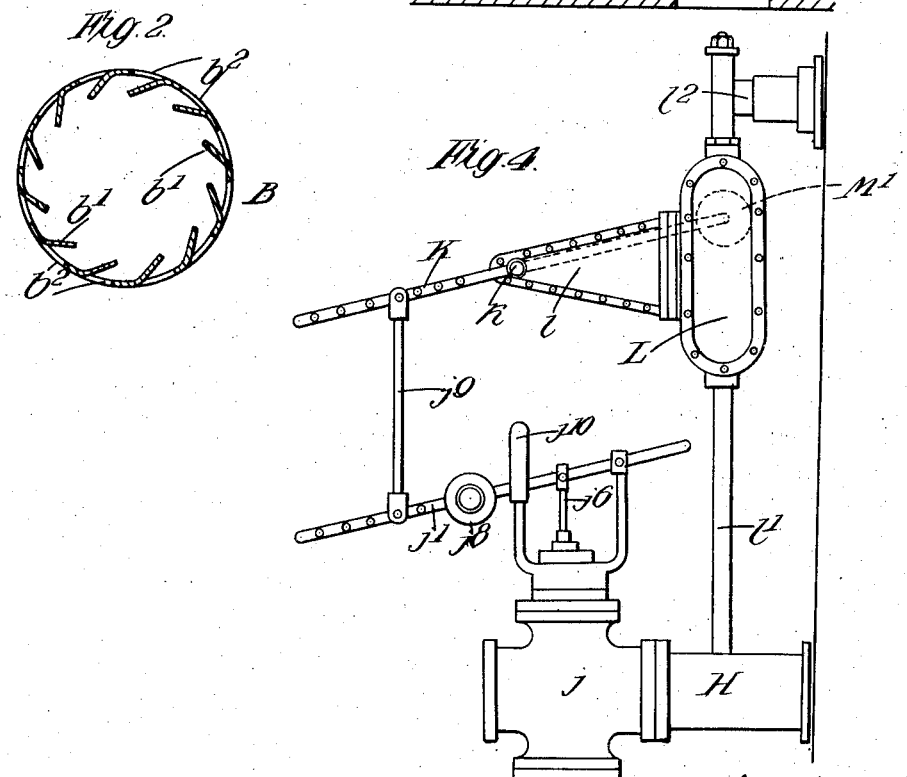

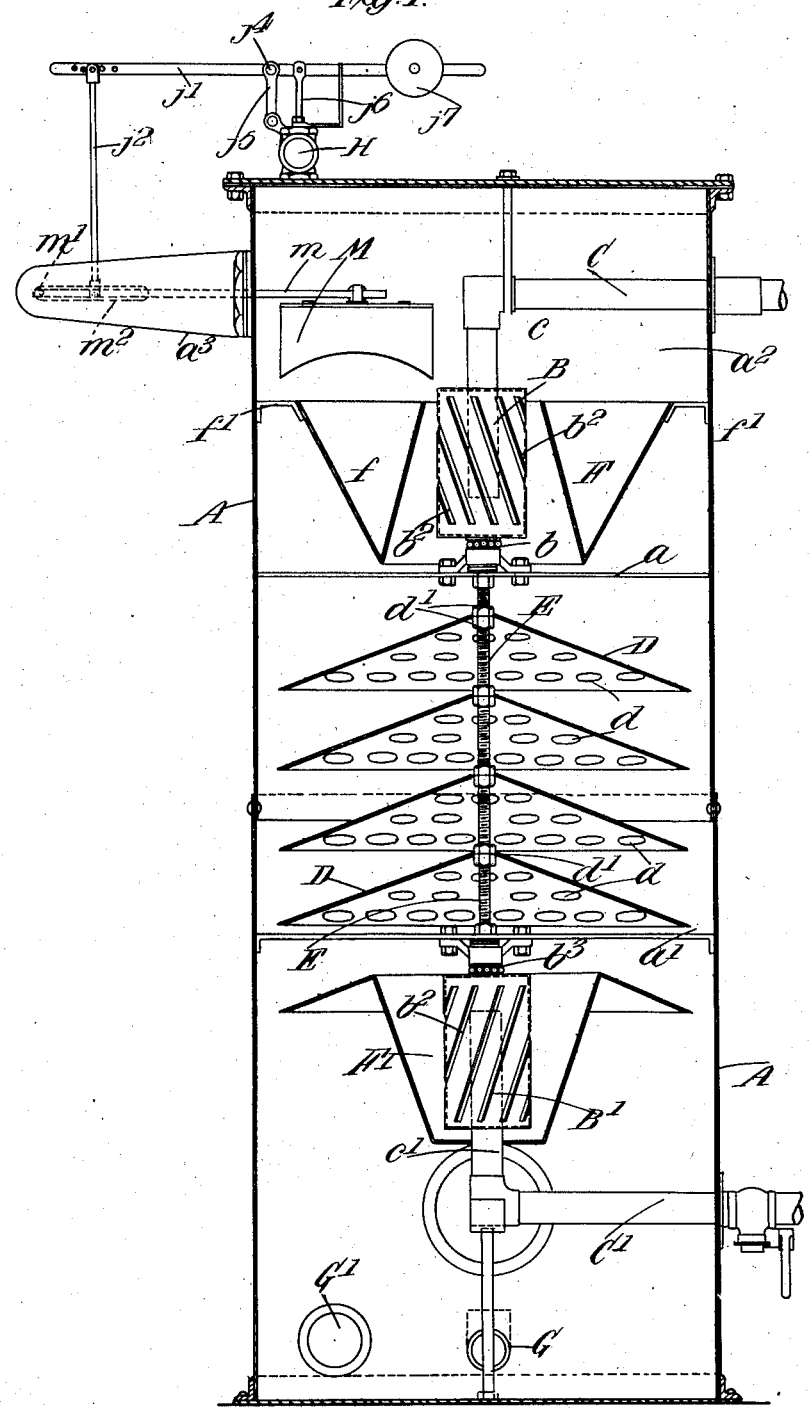

Patented July 12, 1927.  1,635,845

UNITED STATES PATENT OFFICE.

HASTINGS JOHN HOLFORD, OF ADDISCOMBE, ENGLAND, ASSIGNOR OF ONE-HALF TO PERCY PORTWAY HARVEY, OF LONDON, ENGLAND.

MEANS FOR SEPARATING WATER AND OTHER IMPURITIES FROM MINERAL OR OTHER OILS OR LIQUIDS.

Application filed September 9, 1925, Serial No. 55,273, and in Great Britain November 8, 1924.

This invention relates to the construction of dehydrators for use in the gravitational separation of water and other impurities from mineral or other oils or their by-products or other liquids.

According to this invention a vertical column is provided with a series of baffles and the liquid to be separated is passed into the column through a rotatable distributor which directs the entering liquid against a distributing surface. The rotatable distributor is preferably in the form of a cap over the end of the inlet pipe, which cap is made with inclined slots and vanes enabling the flow of the entering liquid to rotate it.

The discharge of the oil is preferably effected automatically through an oil discharge valve at or near the top of the column by means of lever control gear adjusted for varying gravities.

In order that the said invention may be clearly understood and readily carried into effect, the same will now be described more fully with reference to the accompanying drawings, in which:—

Figure 1 is a sectional elevation of the complete apparatus shown in a more or less diagrammatic manner.

Figure 2 is a cross section to a larger scale through part of the apparatus, showing a rotating distributor in plan.

Figure 3 is a sectional detail view showing a valve for the escape of the separated oil; and Figure 4 is an illustration of a modified arrangement for the oil outlet.

A is the casing of the separator column. B, B' are rotatable distributors each connected to an inlet pipe C or C' for the mixed oil and water, the upper and lower inlets and rotatable distributors being used alternatively according to the nature of the mixture to be separated, the lower inlet and distributor being employed when the water is in excess of the oil and the upper inlet and distributor being used when the oil is in excess of the water. D, D are conical perforated cones mounted adjustably on the central spindle E which is carried by the top and bottom brackets $a$, $a'$ extending across the casing. F, F' are special double conical distributor plates placed around the top and bottom rotating distributors B, B'.

The lower cone F' is provided with a broad top flange to spread the descending liquid.

The upper rotating distributor B is mounted upon the bracket or cross bar $a$ of the casing and the downwardly bent end $c$ of the upper inlet pipe extends into the distributor, which is freely rotatable upon the ball bearing $b$. The distributor is provided with a large number of spirally arranged or inclined blades $b'$, the wall of the distributor being formed with spiral or inclined slots $b^2$ between the inclined plates so that the entering liquid as it flows into and through the distributor by its reaction on the blades $b'$ causes a rapid rotation of the distributor which assists in spreading out the entering liquid evenly against the inner cone $f$ of the double conical plate F. The cone $f$ directs the entering liquid downwardly upon the top of the first perforated cone D. Four cones D are shown, all with the numerous apertures $d$, the edges of which cones extend within a short distance of the wall of the casing A and the apertures of the successive cones are preferably staggered so as to cause the downwardly flowing liquid to take a devious path in order to make the separation as efficient as possible. The lighter liquid rising to the top flows into the upper section $a^2$ of the casing past the outer cone of the distributor plate F, which is secured to the casing by the brackets $f'$ to leave clear spaces for the upward flow of the liquid. The downwardly flowing liquid can also pass the edges of the cones D which leave a small clearance between them and the wall.

The position and also the number of the perforated cones D are variable, any desired number of cones being fitted on the center rod E, which is screw threaded to allow the cones to be secured in adjusted position by the clamping nuts $d'$.

The perforated cones have their apertures staggered and the adjustment of the cones, through a manhole in the side of the casing A, enables the apertures of successive cones to be relatively displaced to give any required degree of staggering and consequent resistance to the flow of liquid according to the density and nature of the oils. The lower rotating distributor B' is broadly similar to the upper one B, having spiral or inclined inner blades $b'$ and slots $b^2$, the distributor being mounted at $b^3$ on a ball bearing fitted to the underside of the bracket $a'$. The upper end of the upwardly bent portion $c'$ of the inlet pipe $C'$ projects into the distributor $B'$.

The water and impurities escape from the bottom of the casing A through the outlet G which preferably leads to an upwardly directed pipe allowing an adjustable head of water to be provided so as to regulate the pressure inside the separating chamber. A mud hole $G'$ is also provided in the lower end of the casing to clear out any deposit when required.

The oil which has risen to the top of the casing past the various cones is allowed to escape through the outlet pipe H. This, as shown in Figure 3, (which shows a slight modification of the arrangement indicated in Figure 1), may be provided with a valve J mounted in the casing $j$ on the end of the outlet pipe and controlled through the lever $j'$ and adjustable connection $j^2$ by a float M on the arm $m$, which float is so weighted as to sink in oil but float in water. The arm in Figure 1 is pivoted at $m'$ near the end of the chamber $a^3$ on the side of the casing A, the connection $j^2$ being attached to an arm $m^2$ on the pivot $m'$, which projects at the back through the chamber $a^3$. Adjustment of the valve opening is provided by displacing the connection $j^2$ to any desired position on the arm $j'$ and also (in the form shown in Figure 3) if required by attaching weights to the hook $j^3$ on the other end of the lever arm which is mounted at $j^4$ on a bracket $j^5$ carried by the casing and is attached to the valve stem $j^6$. In Figure 1 a weight $j^7$ is mounted directly on the arm $j'$. The outflow of the oil is, therefore, permitted only when the valve opens under the float control.

Figure 4 shows a modification of the valve arrangement in which the valve itself is on similar lines to that above described, but the arm $j'$ carries an adjustable weight $j^8$ and the adjustable connection $j^9$, which takes the place of the connection $j^2$ of Figure 3, leads upwardly to a second lever arm or radius rod K pivoted at $k$ in the end of an extension $l$ of the float chamber L which is in communication with the interior of the casing A through the pipe $l'$ below and the connection $l^2$ above. The lever $j'$ moves in the guide $j^{10}$. In this arrangement the oil is not drawn from the top of the casing A, but the oil outlet pipe H is connected to the casing at a suitable distance below the top. The float $M'$ inside the external float chamber L controls the operation of the valve through the lever and rod connections, which are adjustable so as to vary the leverage in any manner desired.

What I claim and desire to secure by Letters Patent of the United States is:—

1. Means for separating water and other impurities from oils or like liquids, comprising a column provided with a series of vertically arranged baffles, a freely mounted rotatable distributor into which the liquid enters and through which it passes, reaction surfaces on the said distributor whereby it is rotated by the entering liquid as it passes through, and an external deflecting surface against which the liquid is directed by said distributor.

2. Means for separating water and other impurities from oils or like liquids, comprising a column provided with a series of vertically arranged baffles, a distributing surface for the entering liquid, an inlet pipe for the liquid to be separated, which pipe extends towards the middle of the said column, and a rotatable cap mounted over the end of the inlet pipe and provided with internal slanting blades and inclined slots through which slots the entering liquid is directed against the distributing surface.

3. In separating apparatus as in claim 1, a stationary central support for the said baffles and means by which the baffles are individually adjustable upon the said support.

4. In separating apparatus as in claim 1, a stationary central screwed rod on which the said baffles are mounted and securing and adjusting nuts whereby the baffles may be individually adjusted upon the central rod.

5. Means for separating water and other impurities from oils and like liquids, comprising a column provided with a series of perforated conical stationary baffle plates arranged one above the other, a conical distributing surface for the entering liquid adapted to direct it against the said conical baffles and a freely mounted rotatable distributor into which the liquid enters and through which it passes and is directed against the said conical distributing surface.

HASTINGS JOHN HOLFORD.